United States Patent [19]

Bercovitz

[11] 4,146,058
[45] Mar. 27, 1979

[54] HOSE END PROTECTOR

[76] Inventor: Louis J. Bercovitz, 6510 Drexel Ave., Los Angeles, Calif. 90048

[21] Appl. No.: 895,312

[22] Filed: Apr. 11, 1978

Related U.S. Application Data

[63] Continuation-in-part of Ser. No. 751,650, Dec. 17, 1976, abandoned.

[51] Int. Cl.² .................. F16L 57/00; B65D 59/04
[52] U.S. Cl. ................................ 138/96 R; 138/110
[58] Field of Search .................. 138/96 R, 96 T, 109, 138/110; 239/533.13

[56] References Cited

U.S. PATENT DOCUMENTS

| 577,362 | 2/1897 | Ettlinger | 239/533.13 |
| 2,959,359 | 11/1960 | Casaletto | 239/533.13 X |
| 4,005,735 | 2/1977 | Miyamoto | 138/96 R |

Primary Examiner—William D. Martin, Jr.
Attorney, Agent, or Firm—Albert M. Herzig; Edward C. Walsh

[57] ABSTRACT

A hose end protector is disclosed herein intended to be carried on the end of a hose so as to surround and forwardly project ahead of a threaded coupling for its protection. The protector includes an elongated guard skirt having a connection portion adapted to engage with the hose so that the guard skirt extends about the threaded coupling in spaced relationship whereby the threads of the coupling are protected from damage. In one form, the connection portion includes internal threads matable with the threaded coupling and in another form, the protector is in two parts threaded together, the inner part having internal threads matable with the hose coupling.

9 Claims, 5 Drawing Figures

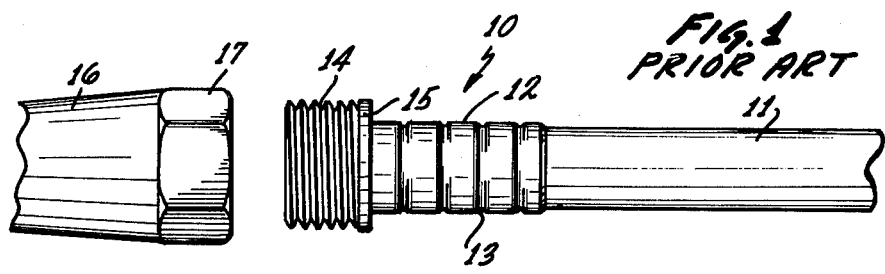
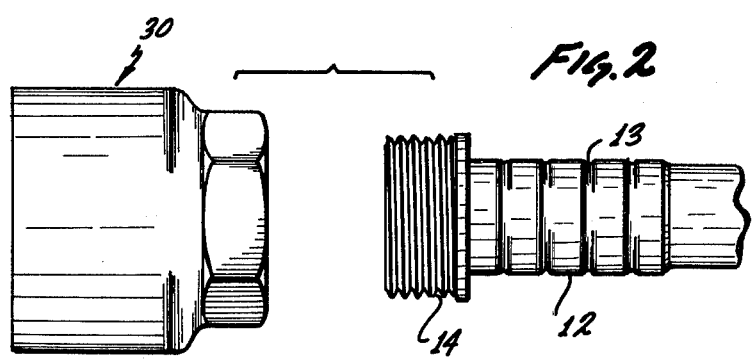
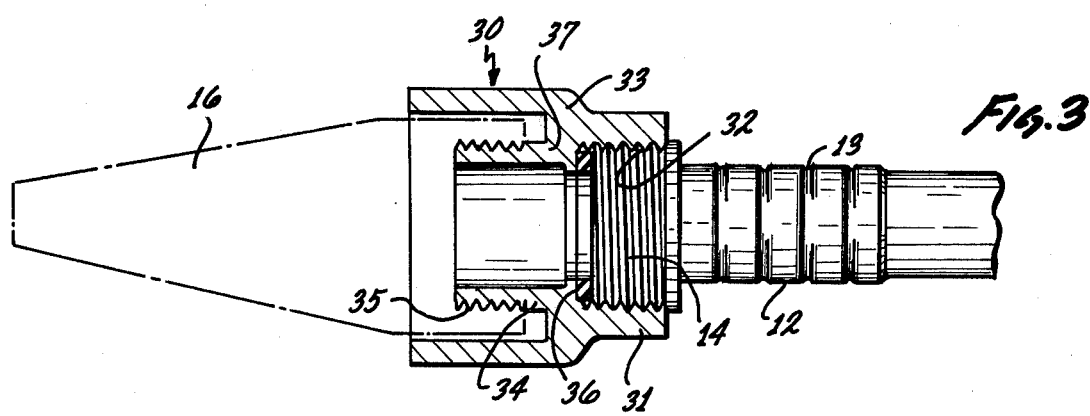
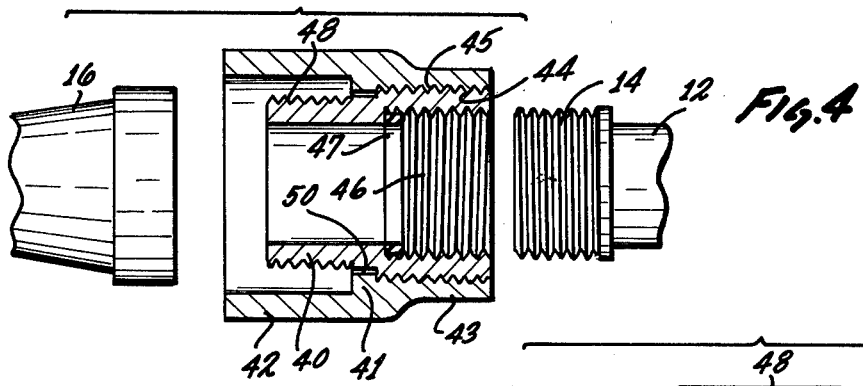
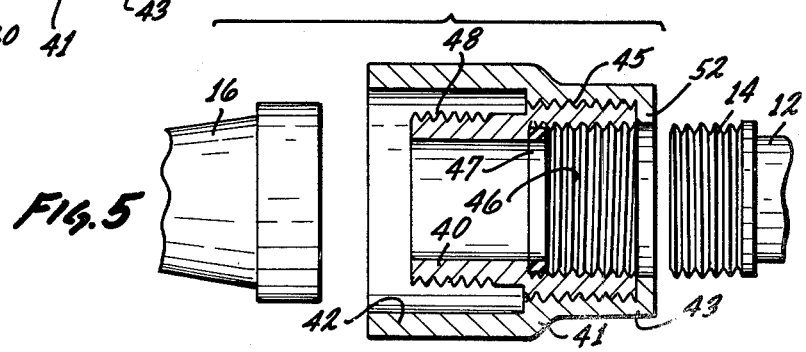

HOSE END PROTECTOR

This application is a continuation in part of Ser. No. 751,650 filed 12/17/76 now abandoned.

BACKGROUND OF THE INVENTION

1. Field of the Invention

This invention relates to coupling protectors and more particularly to a novel protector adapted to be attached to an end of a hose for the protection of the threaded coupling without interference with the subsequent attachment or detachment of nozzles or the like, with respect to the threaded coupling.

2. Brief Description of the Prior Art

In the past, most couplings used on garden hoses are of the threaded type and are standardized as to the threads, sealing surfaces, depth and size of bore and other pertinent details essential to interchange couplings. The threaded coupling is normally intended to receive and threadably engage with fittings such as water taps, nozzles, lawn sprinklers and the like. These couplings function quite well while in a new condition, but unfortunately this condition does not last very long. In couplings of this type, it is usual to leave the threaded coupling unprotected while the coupling is moved about on the end of the hose. Thus, the threaded coupling tends to become dented or otherwise injured which prevents the coupling from making a tight joint when it is coupled up. For example, quite often the hose threaded end or coupling is dropped on cement or stepped upon or dragged over a cement and rigid surface from one spot to another. Such events often damage the coupling threads so that they are rendered cross threaded and as such adversely effects the threads and the sealing of the joints.

It is the conventional practice to manufacture garden hose couplings of metal and the metal has a tendency to gall and seize. This occurs much of the time, especially when damaged mating coupling parts are used to force mating parts together such as by hand tools. Even after all this trouble to assemble the couplings, they generally leak. Leaky hose couplings cause a great waste of fluid and consequently, a great expense through the loss of power and hence, the requirement of having a coupling that is tight and that will remain tight notwithstanding rough handling, is of primary importance.

Therefore, a long standing need is present to provide a novel protector for the threads of a coupling. Some attempts have been made in the past to provide such a protector which are disclosed in U.S. Pat. Nos. 2,334,424; 3,722,924; 947,501; 577,352; 2,959,359 and 4,005,735. Although these prior protection devices for couplings have been partially successful in protecting the coupling from abuse, difficulties have been encountered which stem largely from the fact that the protector must be placed on the end of the tubing or hose during the manufacture of the tubing or hose with special tools and the protector is not suitable for retro-fitting onto existing tubes and hoses. Also, the prior art devices are not detachably connectable to the end of the hose and have no other use than that of protecting the threads.

SUMMARY OF THE INVENTION

Accordingly, the above problems and difficulties are obviated by the present invention which provides a novel threaded coupling protector having an elongated body or sleeve including a connection portion and a forwardly projecting skirt portion. One form the invention includes a connection portion having internal threads mateable with the threads of the threaded coupling so that detachable securement is produced therebetween. The guard skirt projects forwardly and the device further includes a protected set of external threads intended to be received by accessory equipment such as a threaded nozzle. Therefore, it is among the primary objects of the present invention to provide a novel connector protector that may be readily detachable secured to a conventional garden hose for the protection of its threaded couling.

Another object of the present invention is to provide a novel coupling protector for a standard garden hose coupling which protects the hose ends, especially the male threaded end thereof.

Still a further object of the present invention is to provide a novel threaded coupling protector for a hose having a guard skirt projecting forward of the threaded coupling.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of a standard garden hose coupling;

FIG. 2 is a side elevational view, in exploded arrangement, of one embodiment of the present invention preparatory to the threaded coupling protector being secured or assembled with the threaded coupling of the hose;

FIG. 3 is a longitudinal cross sectional view of the protector shown in FIG. 2 after coupling with the threaded coupler of the hose;

FIG. 4 is a cross sectional view of another embodiment of the present invention.

FIG. 5 is a cross sectional view of a form of the invention like that of FIG. 4 but slightly modified.

DESCRIPTION OF THE PREFERRED EMBODIMENT

Referring to FIG. 1, a conventional garden hose assemblage is illustrated in the general direction of arrow 10 which usually includes a flexible hose 11 having a metal coupling 12 attached thereto by means of internal beads such as bead 13 embedded into the material of the hose 11. The coupling 12 includes an enlarged terminating end having a plurality of external, male threads 14 integrally formed with the coupling. The threads terminate in an annular flange 15. The male coupling is intended to detachably receive a discharge nozzle 16 having a rotatable female coupling 17 carried on its extreme end so as to threadably engage with the threaded coupling 14. By means of this conventional construction, the garden hose 11 may supply pressurized water to the discharge end via the threaded coupling 12 when the nozzle 16 is not attached thereto. When the nozzle is attached as described, the water discharge is through the end of the nozzle. However, when the nozzle has been detached, the external threads 14 are subject to damage as previously described. The present invention protects the threads and the entire coupling assembly.

The protector 30 is also provided with a guard skirt indicated by numeral 33 which projects forwardly of the threaded portion 34 of the coupling 12. The guard skirt surrounds the threads 35 in spaced relationship so that the protector will interefere with any object tending to damage or deform the threads. The guard skirt is of substantially larger diameter than the connection portion 31 so that the protector will accommodate the detachable connection of the nozzle 16 with the threaded connector 12. Such attachment is shown in broken lines in FIG. 3.

Referring now in detail to FIGS. 2 and 3, a preferred embodiment of the present invention is illustrated wherein the protector is hsown in the general direction of arrow 30. Protector 30 includes a connection protion 31 having a plurality of flat surfaces constituting a nut so that the protector may be turned onto the external threads 14 associated with the coupling 12. For this purpose, the connection portion 31 includes internal threads represented by numeral 32, in FIG. 3 which threadably engage with the threads 14. The protector 30 includes a forward projecting and outwardly flared guard skirt 33 which is of sufficient diameter to accommodate insertion of the nozzle 16. As illustrated in FIG. 3, the nozzle 16 is threadably attached with a threaded connector or nipple 34 substituting for the threads 14 on coupling 12. The threaded connector 34 includes an open passageway coaxially disposed with respect to the opening or bore in the coupling 12 so that the pressurized water stream may be discharged therethrough. In this embodiment, it can be seen that the threads 14 are protected by the connection portion 31 of the protector 30 while the external, male threads 35 of the coupling 34 are protected by the surrounding skirt 33. It is to particularly noted that the skirt 33 includes an edge marginal region which projects further than the terminating end of the coupling 34. The material is preferably of a rigid and non-flexible material so that no deformation will take place which further protects the threads 35 from damage. To assure a proper seal between the protector and the coupling 12, a suitable washer 36 may be disposed about the passageway within the connection portion 31 so that the extreme circular edge of the threaded coupling 12 may bear against the washer and seal against a shoulder 37 integrally formed with the guard skirt 33 and the threaded coupling 34. No reduction of fluid pressure is experienced since the bore of the threaded coupling 34 is substantially the same as the fluid passageway or bore of hose 11. Also, the skirt 33 is in sufficient space and relationship with respect to the external threads 35 so as to adequately receive and accommodate the attachment portion of the nozzle 16 therewith.

Referring now to FIG. 4, another embodiment of the present invention is illustrated which is substantially similar to the embodiment of FIGS. 3 and 4 wherein the skirt portion 33 of the former embodiment is detachably connected to an adapter coupling broadly identified by numeral 40. In the embodiment of FIG. 4, the guard skirt is a separate unit as indicated by numeral 41 which includes a skirt portion 42 and a connection portion 43 having internal threads 44. The internal threads 44 are threadably mated with external threads 45 carried on a coupler 40. The coupler further includes female threads 46 intended to be threadably mated with external threads 14 of coupling 12 carried on the hose 11. A washer seal may be provided as previously described and it is indicated by the numeral 47. The coupler 40 further includes outwardly projecting external threaded attachment portion or nipple 48 which threadably attaches with the nozzle 16. As previously described, the guard skirt 42 projects forward of the terminating end of the threaded connection 48 so as to protect the threads from damage.

On the inside of unit 41 is an annular shoulder, the inside surface of which is adjacent to the outside of threaded connection 48. It serves as a stop limiting inward movement of nozzle 10. Unit 41 can be threaded off or forwardly on Unit 41.

In FIG. 5, another embodiment of the present invention is illustrated which is very similar to FIG. 4. In FIG. 5, shoulder 50 of FIG. 4 is omitted. This allows Unit 41 with skirt 42 to be threaded along coupling 40 on threads 45 to adjust the extent of skirt 42 extends beyond coupler 40.

In FIG. 5, the Unit 41 has an end flange 52 which can abut the end of coupler 40 to limit movement to the left of Unit 41 on coupler 40 but which allows Unit 41 to be adjusted to the right.

In view of the foregoing, it can be seen that the embodiment or modifications of the present invention provide a novel protection means for surrounding the normally exposed threads of a hose connector whereby the threads are isolated from encounter with rigid or hard surfaces that would normally gall, pit or distort the external threads. The protector includes a guard skirt of rigid material. The various embodiments provide for a protector which may be fabricated in a single piece for attachment with a hose as original equipment or as a single piece which may be sold as a separate unit and attached to an existing hose construction by the user. Also, the protector may be provided with a removable skirt part and the skirt may also be of integral formation with the auxiliary or accessory coupler such as indicated by numeral 34 in FIG. 3. All embodiments not only protect the external threads of the nozzle coupling device but permit the nozzle to be inserted within the surrounding confines of the guard skirt for attachment purposes. A suitable washer may be provided between the terminating and of the hose connector and the protector.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A protector for use with a fluid conducting hose coupling having external threads comprising the combination of:

an elongated cylindrical sleeve having a hose connection portion and a guard skirt portion;

said hose connection portion having means for securing said sleeve to said hose whereby bores of said sleeve and said hose are in coaxial, fluid communication for conducting the pressurized fluid stream therethrough;

said guard skirt cantilevered outwardly and forwardly of said hose externally threaded coupling and having a continuous wall surface in spaced relationship so as to define an annular space adapted to receive a nozzle, said connection portion including a bore having internal, female threads detachable engageable with said hose coupling external threads; and said protector further including an externally threaded coupler coaxially disposed with respect to said guard skirt and said above-mentioned internal threads whereby said coupler projects forwardly of said connection portion so as to selectively receive said nozzle in threaded attachment relationship, said coupler having external threads carried on its opposite ends and an open ended bore therethrough having internal threads at one end of said bore threadably engageable with hose coupling threads and a smooth surface provided at the other end of said bore.

2. A device as in claim 1 wherein said elongated cylindrical sleeve has shoulder means limiting its axial movement relative to said coupler.

3. A device as in claim 2 wherein said shoulder means is an annular rib on the inside of the cylindrical sleeve position to engage a diameter of said coupler.

4. A device as in claim 2 wherein said shoulder means is a flange on the end of the cylindrical sleeve engageable with the end of the coupler.

5. The invention as defined in claim 1 wherein said connection portion includes a plurality of flat surfaces constituting a hexagonal connection for a wrench and said guard skirt is composed of a hard and rigid material.

6. The invention as defined in claim 5 wherein said protector includes a soft washer carried by said connection portion within said bore for sealing between the terminating end of said hose threaded coupling and a shoulder defining the end of said internal female threads.

7. A protector for use with a fluid conducting hose coupling having external threads comprising the combination of:

an elongated cylindrical sleeve having a hose connection portion and a guard skirt portion;

said hose connection portion having means for securing said sleeve to said hose whereby bores of said sleeve and said hose are in coaxial, fluid communication for conducting the pressurized fluid stream therethrough;

said guard skirt cantilevered outwardly and forwardly of said hose externally threaded coupling and having a continuous wall surface in spaced relationship so as to define an annular space adapted to receive a nozzle;

said connection portion including a bore having internal, female threads; and said protector further including an externally threaded coupler coaxially disposed with respect to said guard skirt and said above-mentioned internal threads whereby said coupler projects forwardly of said connection portion so as to selectively receive a nozzle in threaded attachment relationship in the said annular space, said elongated cylindrical sleeve being joinable to a hose coupling by a joint including the connection portion internal female threads.

8. The invention as defined in claim 7 wherein said guard skirt portion normally extends beyond the end of said coupler.

9. The invention as defined in claim 8 wherein said connection portion is integral with said coupler.

* * * * *